Sept. 20, 1960     L. M. CALABRESE     2,952,923
EDUCATIONAL TOY
Filed July 29, 1959

INVENTOR
LOUIS M. CALABRESE

ATTORNEYS

United States Patent Office 2,952,923
Patented Sept. 20, 1960

2,952,923
EDUCATIONAL TOY
Louis M. Calabrese, 193 Garfield Ave., Long Branch, N.J.
Filed July 29, 1959, Ser. No. 830,250
1 Claim. (Cl. 35—36)

This invention relates to an educational toy or device to be used as a lettering guide, etc., for children.

The educational toy of the present invention is a long, multi-sided structure with lettering or the like on the different sides, with a slide extending around the device and having windows on each side on which the letters or the like can be copied, and from which they may be erased, and with protruding portions at the ends of the element for supporting the device and preventing interference with the sliding of the slide when supported on a flat surface.

The new educational toy may be considered a lettering device for teaching children to copy different letters, or a numbering device for teaching children to copy different numbers, or with other simple objects to teach children to copy them. The toy has a plurality of sides and is advantageously made of square cross-section, with four sides, but it can also be made triangular or with other numbers of sides. On each side is arranged a series of letters or numbers or the like to be copied. The slide, with its windows for each side, can slide along the device to bring a window opposite any of the letters or figures or the like on that side. The windows are made of transparent material, such as plastic, which is sufficiently thick or stiff to prevent deformation, and is of a nature that a child can write on it with a crayon or pencil and then erase what has been written to permit moving the slide to another location and copying another letter or figure or the like.

A child will ordinarily use such a toy on a desk or table or on the floor. The end projections, which extend outwardly a distance somewhat greater than the thickness of the slide, serve to support the device and to permit the slide to move freely to different positions and opposite different letters or the like.

The main portion of the device may be made of wood or plastic or metal, and the letters or figures or the like can be painted or printed thereon. The slide itself may be of plastic or with a thin metal frame carrying plastic windows. The end supporting elements may be of the same material as the device itself or of different material.

One simple form of the device is a bar of wood of square cross-section and of a length sufficient to have a number of letters or the like on each side and with end pieces of wood or metal. The slide may have a metal frame carrying the windows and may be made in completed form and slid over one end of the bar before the end piece is added.

When made of metal, the device may be hollow and, when made of plastic, it may be hollow or solid.

For teaching a child his letters, the different letters of the alphabet can be arranged on the different sides of the device, so that one or another of the windows can be brought opposite any one of the letters. When figures are used, the figures may be similarly arranged on all sides of the device; or figures may be arranged on one side and letters on other sides. The letters may be in capitals or in lower case or in printer's type, and letters of foreign alphabets can also be used. Drawings of simple devices or objects such as animals, buildings, etc., can also be provided on one or more sides.

The pencils that are used with the device are pencils of the kind which will write on the transparent windows, and the writing erased therefrom. With a wooden device, a hole can be provided in one end to receive a pencil, or a pencil of suitable quality can be secured by a cord to one end of the device.

The invention will be further illustrated by the accompanying drawings, which illustrate two different forms thereof, but it will be understood that the invention is not limited thereto.

Figure 1:
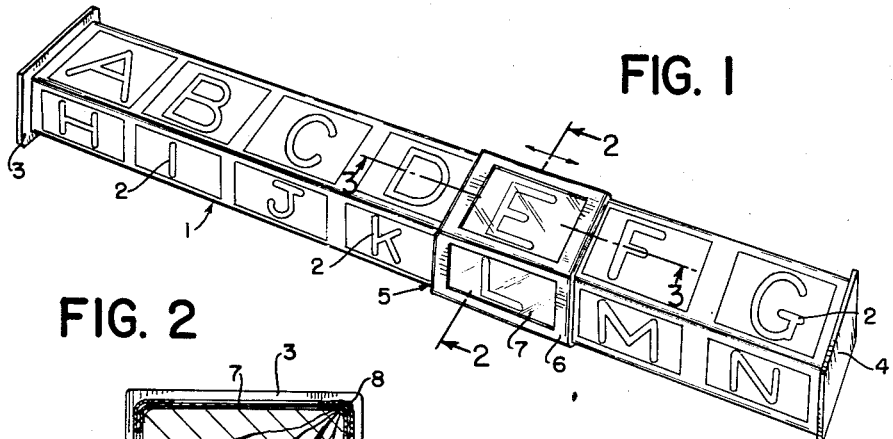
Fig. 1 shows in perspective one form of the toy, of square cross-section and made of wood.
Figure 2:
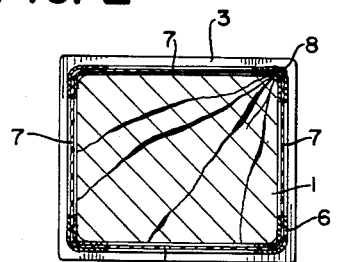
Fig. 2 is a section taken on the line 2—2 of Fig. 1.
Figure 3:
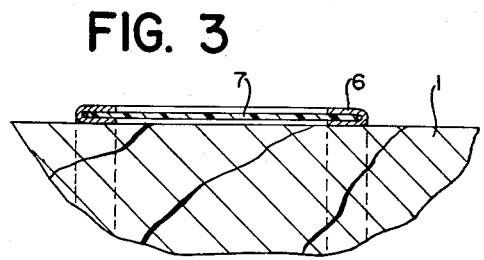
Fig. 3 is a section through the slide taken on the line 3—3 of Fig. 1.

The toy shown in Figs. 1 to 4 is made up of a long, four-sided member 1, shown as made of wood, having a series of letters 2 arranged at intervals on each side and with end pieces 3 and 4 secured to the ends of the device to support it and hold it above the table or floor to prevent interference with free movement of the slide.

Surrounding this device is a slide 5 made up of a metal frame, indicated at 6, with windows 7 secured therein, so that there are four windows for the four sides of the square bar 1. One form of slide is shown in section in Fig. 3, with the ends of the slide bent over to hold the windows as shown. Such a slide can readily be made of metal, by bending it into the form of a square slide and welding or brazing the ends together as indicated at 8.

Figure 4:
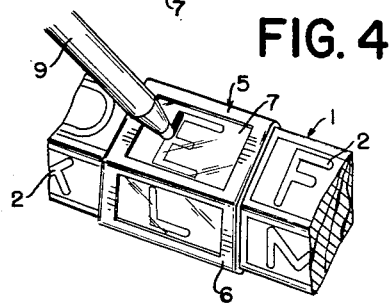
Fig. 4 is a view of a section of the device as it is used.

The method of using the slide is illustrated in Fig. 4 where the pencil 9 is shown as copying on the transparent window of the letter E. A child can copy any desired letter with a pencil, erase the letter, move the slide to another letter, and copy it. Also a child can copy all the letters under the windows on the opposite sides before erasing them and moving the slide to a new position.

Figure 5:
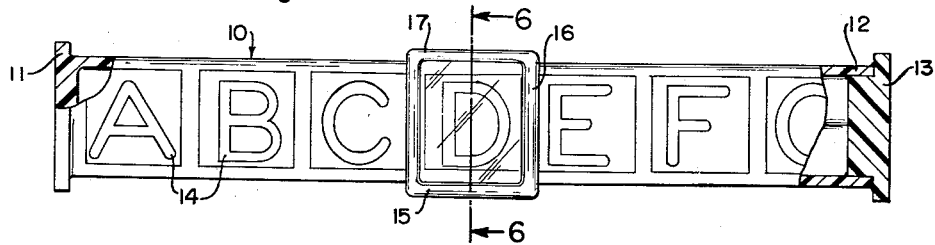
Fig. 5 is a modified form of the device.
Figure 6:
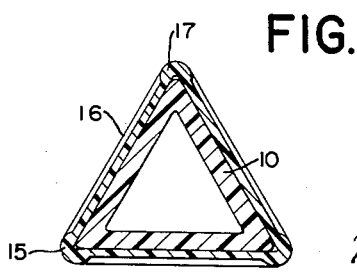
Fig. 6 is a section taken on the line 6—6 of Fig. 5.

A modified form of the device is shown in Figs. 5 and 6. The member 15 in this case is triangular in cross-section and made of plastic, with one end portion 11 integral with the triangular member and the other end open and having a plastic plug 13 inserted therein and cemented thereto. Letters 14 are arranged on each side of this device. The slide 15 in Fig. 5 is made of a single piece of transparent plastic of a size which enables it to slide freely over the triangular member 10, and somewhat thickened at its ends 16 and at its angles 17. This slide can readily be slid over the triangular member before the plug 13 is inserted.

In using the device, a child will place it on a table or desk or on the floor, where it will be supported by its end members to permit the slide to slide freely from one end to the other. By moving the slide to the position shown in Fig. 4, a child can copy the letter E on the top window, and by turning over the slide 90°, can copy the letter L. By erasing these letters and moving the slide opposite other letters, these can be similarly copied. A child can thus be taught or may teach himself to copy the different letters or different numbers or different pictures on the different sides of the toy.

The toy is of simple construction. The slide is freely slidable along the length of the device opposite one or another letter or figure, etc. The end members at the ends of the device project a sufficient distance so that the device will be supported a sufficient distance above the table or floor or other means of support so that the slide will not itself be supported except by the device itself, and so that it can slide freely in either direction.

I claim:

An educational toy for the teaching of lettering and the like, having a long multi-sided member with letters or the like on each side, a slide surrounding the multi-sided member, having windows on each side, which can slide along the member to locate a window opposite any particular letter or the like on that side, said windows having outer surfaces of a nature to permit writing thereon and erasure of the writing therefrom, and end supporting elements for supporting the device on all sides to permit free sliding of the slide.

References Cited in the file of this patent

UNITED STATES PATENTS

| | | |
|---|---|---|
| 603,695 | Keuffel | May 10, 1898 |
| 627,132 | McBride | June 20, 1899 |
| 1,129,573 | Johnson | Feb. 23, 1915 |
| 1,461,975 | Eaton et al. | July 17, 1923 |
| 2,894,337 | Rawlings | July 14, 1959 |